Nov. 20, 1945. J. EVANS 2,389,422
CULTIVATOR
Filed Feb. 1, 1944 2 Sheets-Sheet 1
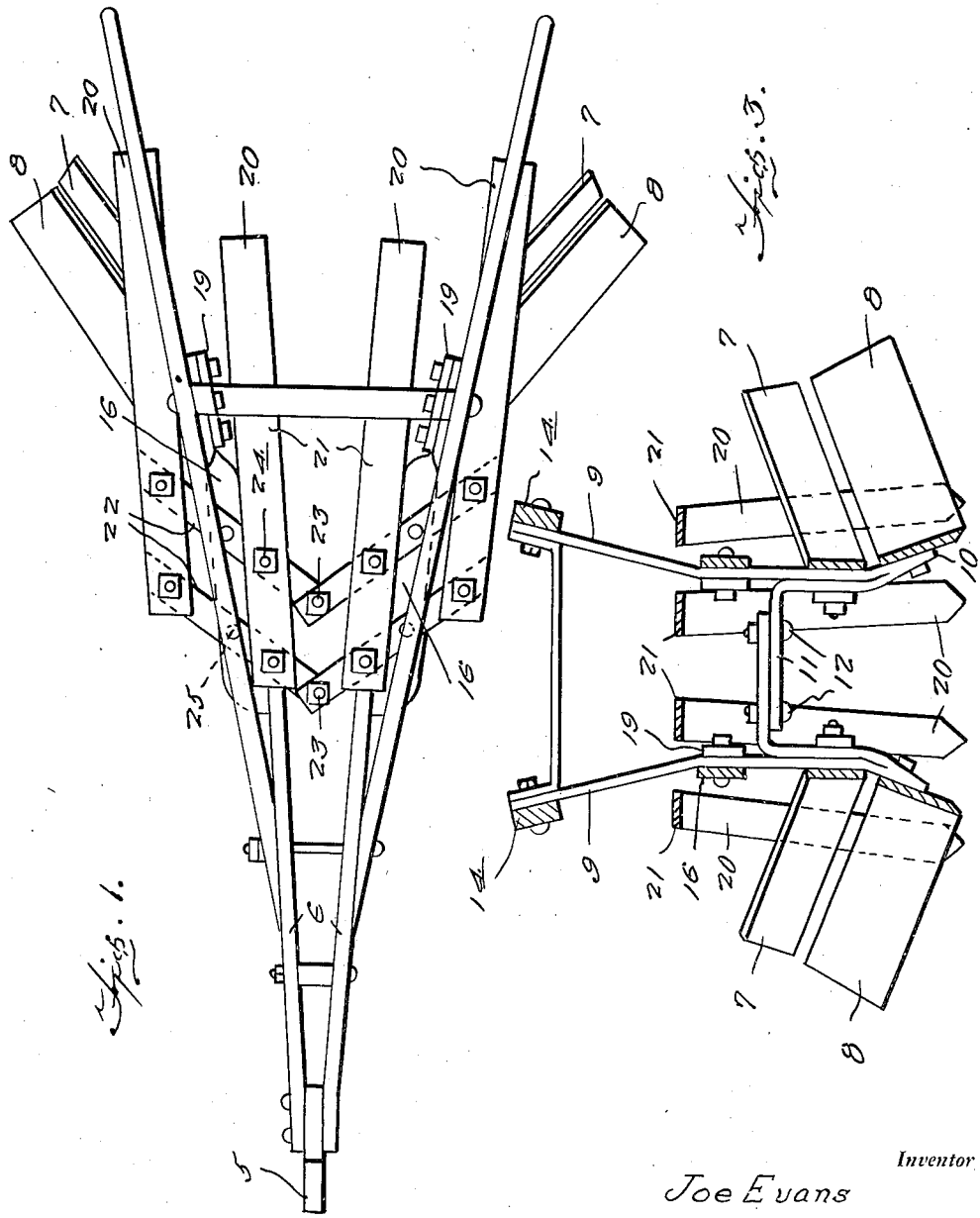
Inventor
Joe Evans
By Clarence A. O'Brien
and Harvey B. Jacobson
Attorneys Nov. 20, 1945. J. EVANS 2,389,422
CULTIVATOR
Filed Feb. 1, 1944 2 Sheets-Sheet 2
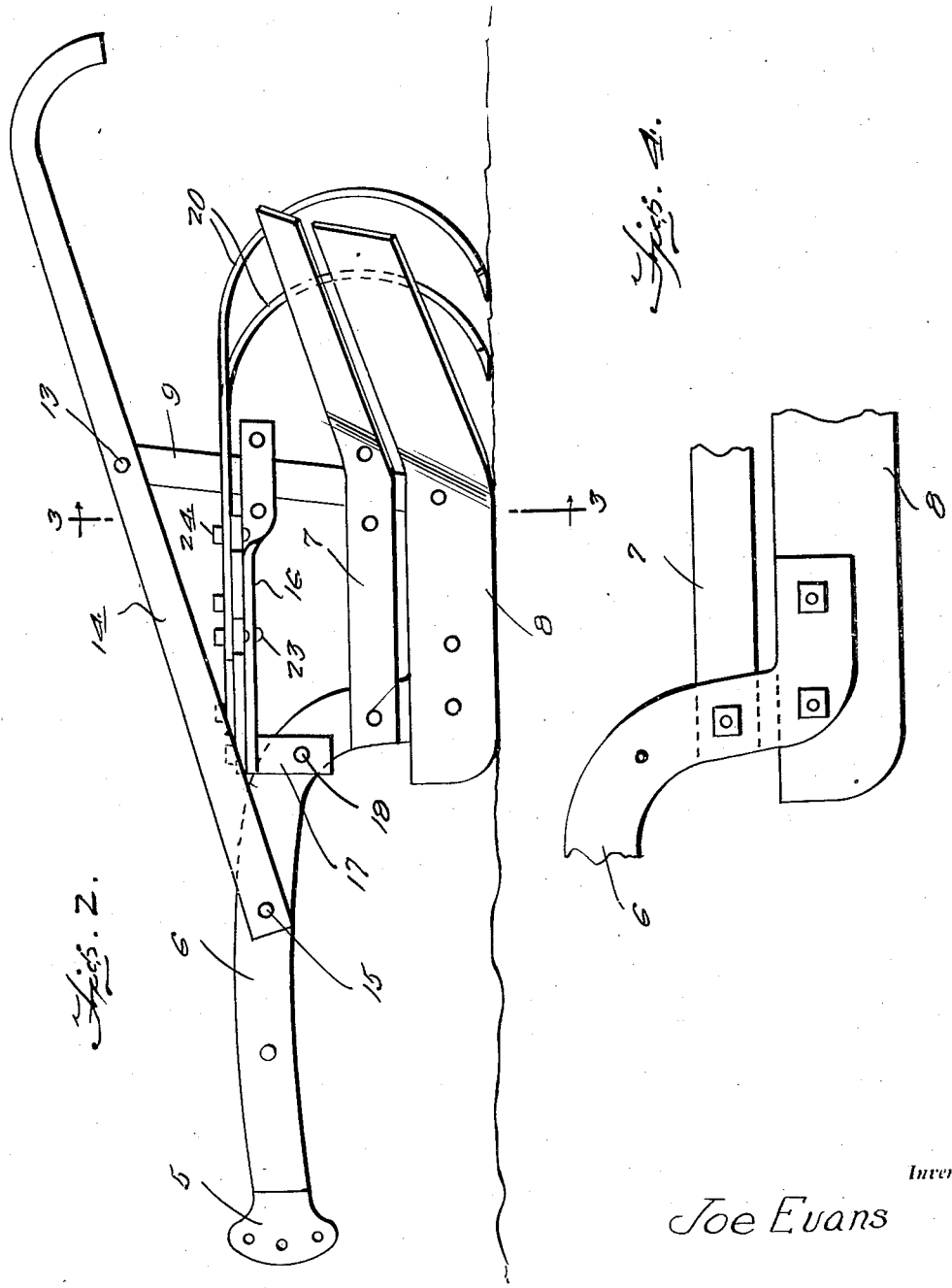
Inventor
Joe Evans
By Clarence A. O'Brien
and Harvey B. Jacobson
Attorneys Patented Nov. 20, 1945

2,389,422

UNITED STATES PATENT OFFICE 2,389,422

CULTIVATOR

Joe Evans, Heflin, Ala.

Application February 1, 1944, Serial No. 520,659

1 Claim. (Cl. 97—170)

This invention relates to new and useful improvements in cultivators and is an improvement on my Patent No. 2,195,513, issued April 2, 1940.

The principal object of the present invention is to provide a row straddling cultivator which in addition to the soil scraping blades employed in my Patent No. 2,195,513, employs spring cultivator teeth which trail said blades.

Other important objects and advantages of the invention will become apparent to the reader of the following description.

In the drawings—

Figure 1 represents a top plan view.

Figure 2 is a side elevation.

Figure 3 is a cross section taken on the line 3—3 of Figure 2.

Figure 4 is a fragmentary elevational view looking at the inside of the cultivator.

Referring to the drawings wherein like numerals designate like parts, it can be seen that numeral 5 denotes a draft plate which can be connected with either horse-pulled or tractor-pulled equipment and extending backwardly from this plate 5 are tongue arms 6, 6.

The forward ends of upper and lower blades 7, 8 (a pair at each side of the cultivator) are secured to the depending rear portions of the tongue arms 6.

A frame structure made up of a pair of vertical side members 9, 9 is employed for spreading the blades and otherwise bracing the entire structure.

Each of the members 9 consists of a vertically disposed piece of strap iron having its lower portion slightly inclined or diverged outwardly as at 10 from where it returns along itself for about a third of its length and then disposed outwardly to define an arm 11. The arms 11 are bolted together as at 12.

The upper ends of the members 9, 9 are secured as at 13 to the mid-points of handle bars 14, the forward ends of which are secured as at 15 to the tongue arms 6.

A shelf (preferably of strap iron) 16 is provided at each side of the cultivator, its forward end being provided with a depending portion 17 secured as at 18 to the corresponding tongue arm 6 while its rear end is clamped as at 19 to a midpoint of the corresponding upright member 9.

A plurality of curved spring cultivator teeth 20 have their upper horizontal shank portions 21 bolted to inwardly converging horizontal bars 22 which are secured together at their inner ends by bolts 23. The shanks 21 are bolted as at 24 to the bars 22, and the bars 22, in turn, are bolted as at 25 to the shelves 16. Thus the parts are sturdily assembled against strain and undue wear. The device will straddle a row of crops and after the blades 7, 8 have performed their function, the teeth 20 in following perform theirs.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a cultivator having a draft tongue comprising a pair of rearwardly diverging arms having depending ends, a pair of handlebars extending rearwardly and upwardly from said arms beyond said ends of the arms, a vertical frame in the rear of said arms including side members connected at upper ends thereof to said handlebars, guide plates attached to said ends of the arms and to the side members, a pair of horizontal shelves extending rearwardly from said arms and secured to said side members, cross bars secured to said shelves in forwardly converging pairs, and cultivator teeth trailing said blades and having forwardly extending shanks overlying and secured to said cross bars.

JOE EVANS.